United States Patent
Magnusson et al.

[19]

[11] Patent Number: 6,163,524
[45] Date of Patent: Dec. 19, 2000

[54] CODE ALLOCATION IN CDMA

[75] Inventors: Sverker Magnusson, Stockholm; Farooq Khan, Kista; Magnus Persson, Sollentuna; Per Beming, Stockholm, all of Sweden

[73] Assignee: Telefonaktiebolaget LM Ericsson (publ), Stockholm, Sweden

[21] Appl. No.: 09/175,012

[22] Filed: Oct. 19, 1998

[51] Int. Cl.$^7$ .................................................. H04B 7/216
[52] U.S. Cl. ............................................ 370/208; 370/342
[58] Field of Search .................................... 370/335, 208, 370/347, 441, 442, 209, 468, 469, 474, 342; 375/206

[56] References Cited

U.S. PATENT DOCUMENTS

| | | | |
|---|---|---|---|
| 5,353,332 | 10/1994 | Raith et al. | 455/455 |
| 5,357,454 | 10/1994 | Dent. | |
| 5,550,809 | 8/1996 | Bottomley et al. | |
| 5,751,761 | 5/1998 | Gilhousen. | |
| 5,809,060 | 9/1998 | Cafarella et al. | 375/206 |
| 5,818,829 | 10/1998 | Raith et al. | 370/347 |
| 5,937,014 | 8/1999 | Pelin et al. | 379/340 |

FOREIGN PATENT DOCUMENTS

| | | |
|---|---|---|
| 814 581 | 12/1997 | European Pat. Off. . |
| 95/03652 | 2/1995 | WIPO . |
| WO95/03652 | 2/1995 | WIPO . |
| 97/15985 | 5/1997 | WIPO . |
| 98/37703 | 8/1998 | WIPO . |

OTHER PUBLICATIONS

Okawa, K. et al., "Orthogonal Multi–Spreading Factor Forward Link For Coherent DS–CDMA Mobile Radio", IEEE 5th International Conference on Universal Personal communications, vol. 2, 12–16, pp. 618–622, Oct. 1997.

UTRA FDD, Spreading Modulation and Descriptionm UMTS (xx.05) VO. 1.0, ETSI (Sep. 1998).

*Primary Examiner*—Huy D. Vu
*Assistant Examiner*—Alexander Boakye
*Attorney, Agent, or Firm*—Burns, Doane, Swecker & Mathis, L.L.P.

[57] ABSTRACT

In spread spectrum communications, a method for allocating and re-allocating channelization codes to new and existing channels in a way that makes the maximum number of codes available at a given time for channels of different rates and different spreading factors. If re-allocations are not performed, a communication system employing the invention has a higher capacity than a system employing a random allocation strategy. The invention also reduces signaling overhead for re-allocations in comparison to a random allocation strategy because fewer re-allocations are necessary.

13 Claims, 6 Drawing Sheets

spread data and control bits scrambled with a base station specific code

CODE ALLOCATION IN CDMA

BACKGROUND

This invention relates generally to electrical communication and particularly to mobile radio communication and even more particularly to code division multiple access in such communication.

Modern communication systems, such as cellular and satellite radio systems, employ various modes of operation (analog, digital, and hybrids) and access techniques such as frequency division multiple access (FDMA), time division multiple access (TDMA), code division multiple access (CDMA), and hybrids of these techniques.

In a typical direct sequence CDMA (DS-CDMA) system, an information bit stream to be transmitted is superimposed on a much-higher-rate bit stream that typically consists of consecutive symbols that are sometimes called spreading sequences. Each bit of a spreading sequence is commonly called a chip. Usually, each information bit stream is allocated a unique spreading sequence that is consecutively repeated to form the much-higher-rate bit stream. Each bit of the information bit stream and the spreading sequence are typically combined by multiplication, or modulo-2 addition, in a process sometimes called coding or spreading the information signal. The combined bits stream may be scrambled by multiplication by another, usually pseudo-noise, bit stream, with the result transmitted as a modulation of a carrier wave. A receiver demodulates the modulated carrier and correlates the resulting signal with the scrambling bit stream and the unique spreading sequence to recover the information bit stream that was transmitted.

Digital cellular communication systems have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

Figure 1:
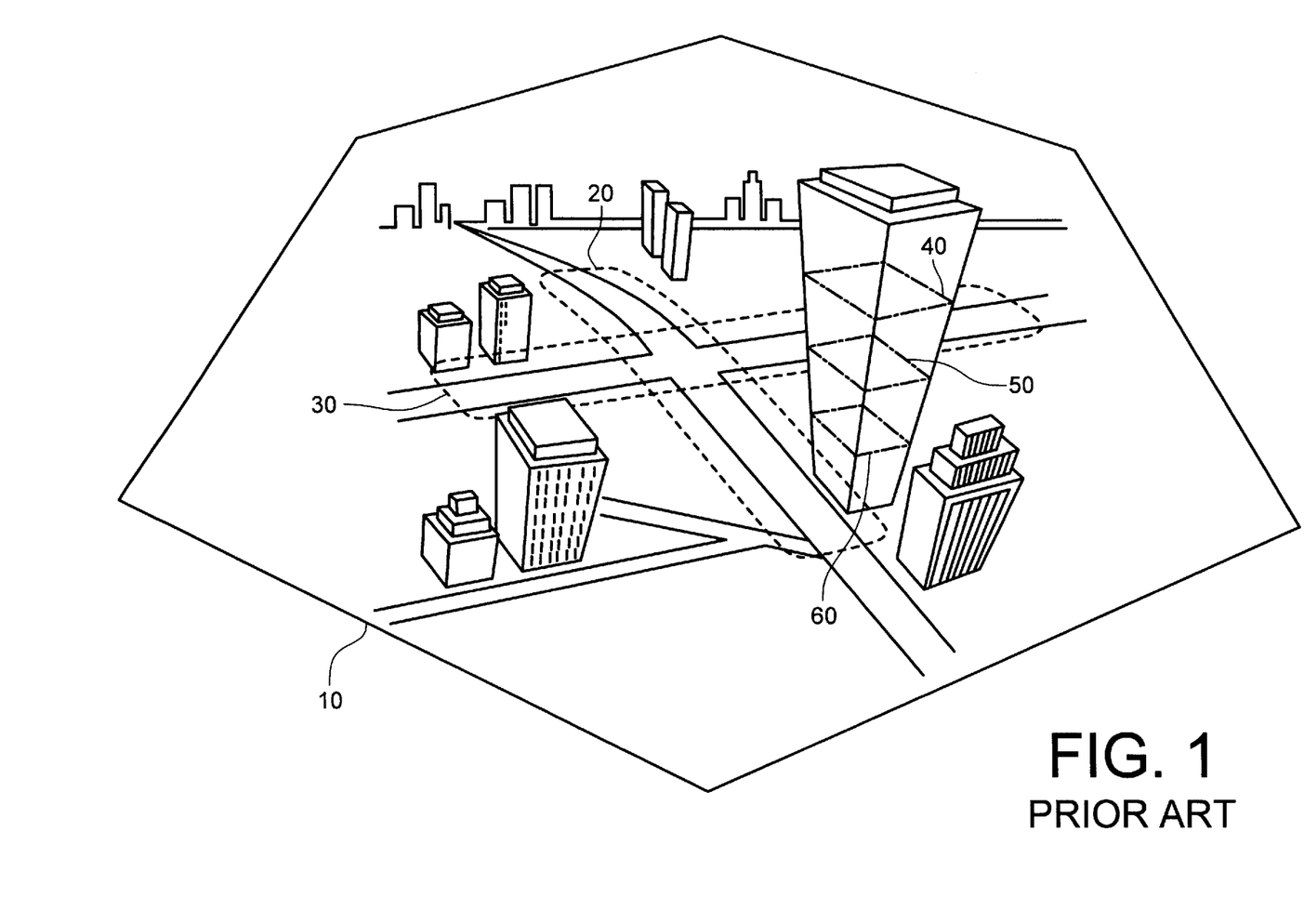
FIG. 1 illustrates an exemplary hierarchical, or multi-layered, cellular system.

FIG. 1 illustrates an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

Figure 2:
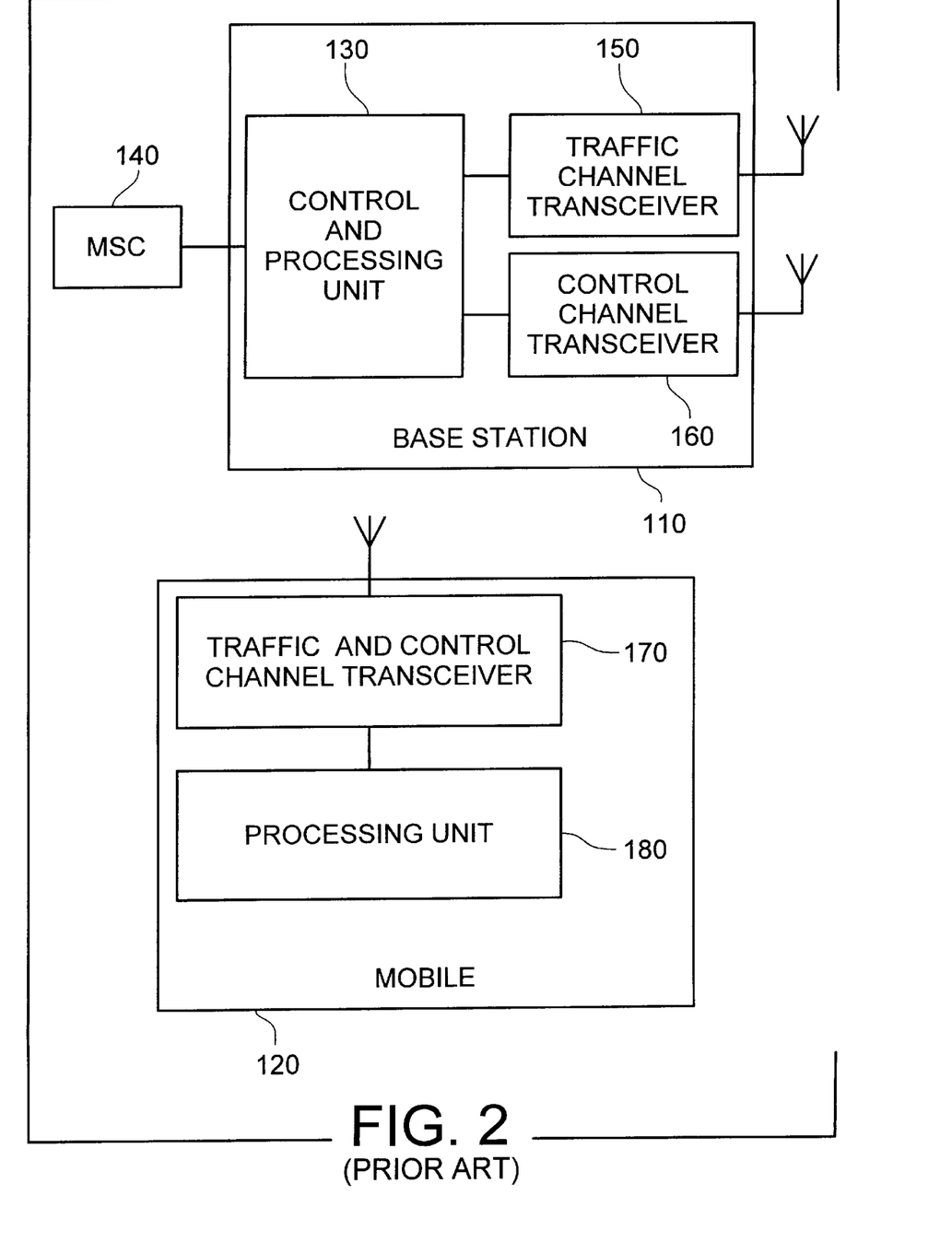
FIG. 2 is a block diagram of an exemplary cellular mobile radiotelephone system.

FIG. 2 is a block diagram of an exemplary cellular mobile radiotelephone system, including an exemplary base station (BS) 110 and mobile station (MS) 120. The BS includes a control and processing unit 130 which is connected to a mobile switching center (MSC) 140 which in turn is connected to the public switched telephone network (PSTN) (not shown). General aspects of such cellular radiotelephone systems are known in the art. The BS 110 handles a plurality of traffic channels, which may carry voice, facsimile, video, and other information, through a traffic channel transceiver 150, which is controlled by the control and processing unit 130. Also, each BS includes a control channel transceiver 160, which may be capable of handling more than one control channel. The control channel transceiver 160 is controlled by the control and processing unit 130. The control channel transceiver 160 broadcasts control information over the control channel of the BS or cell to MSs locked to that control channel. It will be understood that the transceivers 150 and 160 can be implemented as a single device, like the traffic and control transceiver 170, for use with control and traffic channels that share the same radio carrier.

The MS 120 receives the information broadcast on a control channel at its traffic and control channel transceiver 170. Then, the processing unit 180 evaluates the received control channel information, which includes the characteristics of cells that are candidates for the MS to lock on to, and determines on which cell the MS should lock. Advantageously, the received control channel information not only includes absolute information concerning the cell with which it is associated, but also contains relative information concerning other cells proximate to the cell with which the control channel is associated, as described for example in U.S. Pat. No. 5,353,332 to Raith et al., entitled "Method and Apparatus for Communication Control in a Radiotelephone System".

In North America, a digital cellular radiotelephone system using TDMA is called the digital advanced mobile phone service (D-AMPS), some of the characteristics of which are specified in the TIA/EIA/IS-136 standard published by the Telecommunications Industry Association and Electronic Industries Association (TIA/EIA). Another digital communication system using DS-CDMA is specified by the TIA/EIA/IS-95 standard, and a frequency hopping CDMA communication system is specified by the EIA SP 3389 standard (PCS 1900). The PCS 1900 standard is an implementation of the GSM system, which is common outside North America, that has been introduced for personal communication services (PCS) systems.

Several proposals for the next generation of digital cellular communication systems are currently under discussion in various standards setting organizations, which include the Intentional Telecommunications Union (ITU), the European Telecommunications Standards Institute (ETSI), and Japan's Association of Radio Industries and Businesses (ARIB). Besides transmitting voice information, the next generation systems can be expected to carry packet data and to interoperate with packet data networks that are also usually designed and based on industry-wide data standards such as the open system interface (OSI) model or the transmission control protocol/Internet protocol (TCP/IP) stack. These standards have been developed, whether formally or de facto, for many years, and the applications that use these protocols are readily available. The main objective of standards-based networks is to achieve interconnectivity with other networks. The Internet is today's most obvious example of such a standards-based packet data network in pursuit of this goal.

In most of these digital communication systems, communication channels are implemented by frequency modulating radio carrier signals, which have frequencies near 800 megahertz (MHz), 900 MHz, 1800 MHz, and 1900 MHz. In TDMA systems and even to varying extents in CDMA systems, each radio channel is divided into a series of time slots, each of which contains a block of information from a user. The time slots are grouped into successive frames that each have a predetermined duration, and successive frames may be grouped into a succession of what are usually called superframes. The kind of access technique (e.g., TDMA or CDMA) used by a communication system affects how user information is represented in the slots and frames, but current access techniques all use a slot/frame structure.

Time slots assigned to the same user, which may not be consecutive time slots on the radio carrier, may be considered a logical channel assigned to the user. During each time slot, a predetermined number of digital bits are transmitted according to the particular access technique (e.g., CDMA) used by the system. In addition to logical channels for voice or data traffic, cellular radio communication systems also provide logical channels for control messages, such as paging/access channels for call-setup messages exchanged by BSs and MSs and synchronization channels for broadcast messages used by MSs and other remote terminals for synchronizing their transceivers to the frame/slot/bit structures of the BSs. In general, the transmission bit rates of these different channels need not coincide and the lengths of the slots in the different channels need not be uniform. Moreover, third generation cellular communication systems being considered in Europe and Japan are asynchronous, meaning that the structure of one BS is not temporally related to the structure of another BS and that an MS does not know any of the structures in advance.

Figure 3:
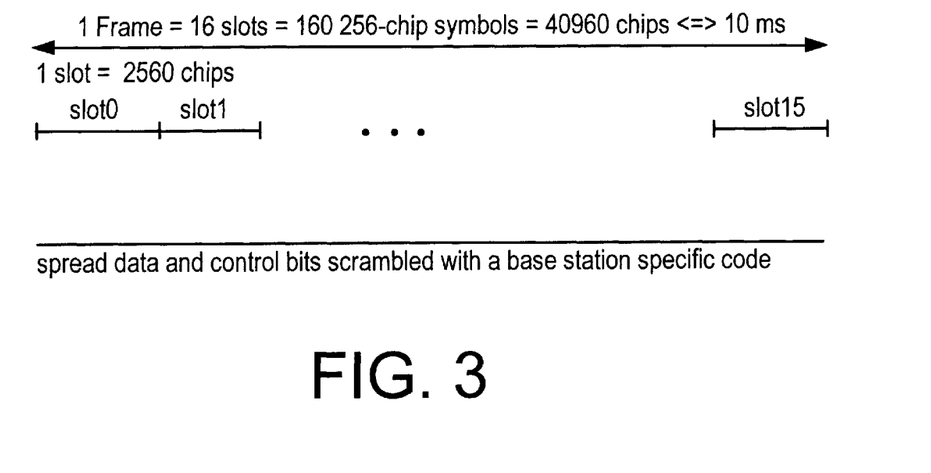
FIG. 3 illustrates a radio frame that comprises CDMA chips divided among sixteen slots.

FIG. 3 illustrates a radio frame that includes a number of complex (in-phase and quadrature) chips divided among sixteen slots. The radio frame may have a duration of ten milliseconds (10 ms) and include 40960 chips. Each slot thus includes 2560 chips, which may represent ten 256-chip symbols. Such a frame/slot/chip structure is a feature of a third generation, wideband CDMA communication system under consideration by ETSI. The radio signal transmitted by a BS in such a communication system is the sum of spread and scrambled data and control bits and an unscrambled synchronization channel. Data and control bits are typically spread by either bit-wise (DS-CDMA) or block-wise replacement by an orthogonal sequence or sequences, such as Walsh-Hadamard sequences. (This is sometimes called m-ary orthogonal keying.) As noted above, the spread results are then scrambled usually by bit-wise modulo-2 addition of a pseudo-noise (PN) scrambling sequence.

It will be appreciated that the data bits include user information, such as audio, video, and text information, and that the information of different users is made distinguishable, in accordance with CDMA principles, by using distinguishable spreading sequences, such as mutually orthogonal Walsh-Hadamard sequences. In a sense, then, each user's Walsh-Hadamard sequence(s) define that user's communication channel, and thus these distinguishable sequences are said to channelize the user information. The construction of sequences according to their correlation properties is described in U.S. Pat. No. 5,353,352 to P. Dent et al. for "Multiple Access Coding for Radio Communications" and U.S. Pat. No. 5,550,809 to G. Bottomley et al. for "Multiple Access Coding Using Bent Sequences for Mobile Radio Communications". These patents are expressly incorporated here by reference.

In conventional CDMA communication systems, each Walsh-Hadamard sequence is a row of an MxM Walsh-Hadamard matrix $H_M$, and the entries in $H_M$ (the components of the sequences) are either +1 or −1. The matrix $H_M$ is generated in the usual way according to the following expression:

$$H_M = \begin{bmatrix} H_{M/2} & H_{M/2} \\ H_{M/2} & -H_{M/2} \end{bmatrix}$$

with $H_1$=[+1] or [−1].

One of the advantages of Walsh-Hadamard sequences for channelization is that user information in a received signal can be efficiently recovered by decorrelation using a Fast Walsh Transform (FWT). Methods and apparatus for performing an FWT are described in U.S. Pat. No. 5,357,454 to Dent for "Fast Walsh Transform Processor", which is expressly incorporated here by reference. Walsh-Hadamard sequences have structural properties that make correlation of a received signal with candidate Walsh-Hadamard sequences possible to do with much less complexity than brute force correlations. The results of an FWT operation are substantially identical to correlating the received sequence with all Walsh-Hadamard sequences of a given length. The correlation of one received length-M sequence with a bank of M length-M candidate sequences generally requires on the order of $M^2$ operations. Using Walsh-Hadamard sequences, the correlation of a received sequence requires only on the order of $M \cdot \log_2 M$ operations since the FWT can be utilized.

It is desirable to provide various types of communication services to meet various consumer demands, such as voice telephony, facsimile, e-mail, video, Internet access, etc. Moreover, it is expected that users may wish to access different types of services at the same time. For example, a video conference between two users would involve both voice and video support. Some services require higher data rates than others, and some services would benefit from a data rate that can vary during the communication.

Varying the spreading factor is a known technique for accommodating variable data rates in spread spectrum communication systems. This and other CDMA communication techniques are described in U.S. patent application Ser. No. 08/890,793 filed by F. Ovesjo et al on Jul. 11, 1997, for "Channelization Code Allocation for Radio Communication Systems", which is incorporated here by reference, and in U.S. Pat. No. 5,751,761 to Gilhousen. As mentioned above, a DS-CDMA spread spectrum system spreads a data signal across an available bandwidth by multiplying the data signal by spreading sequences. By varying the number of chips per data symbol, i.e., by varying the spreading factor, while keeping the transmitted chip rate fixed, the effective data rate can be controllably varied. It will be understood that the data rate, or channel bandwidth, is determined, at least in part, by the spreading sequence's length M, i.e., the spreading factor applied to the data (information bits).

In typical implementations of the variable spreading factor approach, the spreading factor is limited by the relationship to $SF=2^k \times SF_{min}$ where $SF_{min}$ is the minimum allowed spreading factor corresponding to the highest allowed user rate. In currently proposed WCDMA communication systems, the spreading factor can be one of a number of predetermined values, e.g., 256, 128, 64, or 32, that correspond to channel bit rates of 16, 32, 64, and 128 kbps, respectively.

These variable spreading factors can be provided by respective subsequences of a family of Walsh-Hadamard sequences. These orthogonal variable spreading factor (OVSF) sequences can preserve the orthogonality between channels of different bit rates 30 and spreading factors, and they can conveniently be organized in a tree structure. This is described in Section 6.2.1 of *UTRA FDD, Spreading Modulation and Description*, UMTS (xx.05) v0.1.0, ETSI Secretariat (Sep. 1998), and in U.S. Pat. No. 5,751,761 cited above.

Figure 4:
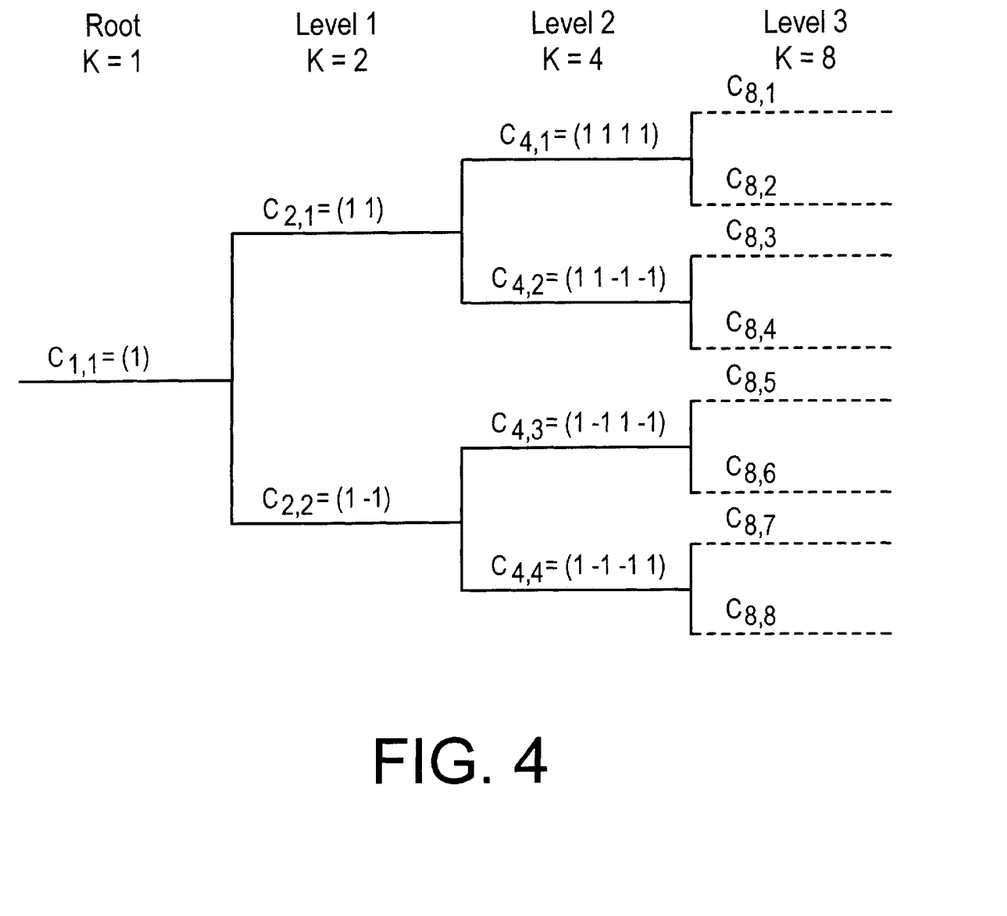
FIG. 4 depicts a code tree that defines channelization codes of length k.

FIG. 4 depicts a typical tree structure for Walsh-Hadamard sequences, or codes. Levels in the code tree define channelization codes of different lengths, corresponding to different spreading factors. In FIG. 4, the root of the tree is indicated by code $C_{1,1}$ that has a spreading factor SF=1, level 1 of the tree includes codes $C_{2,1}$ and $C_{2,2}$ that each have spreading factors of 2, and so forth. At each level, exemplary corresponding sequences, or codes, are indicated. For the root level, the example shown is [1], for level 1, the example codes shown are [1 1] and [1 –1], and so forth. In the notation $C_{k,i}$ illustrated, k is the spreading factor SF and the index i simply distinguishes codes at the same level. It will be appreciated that the tree continues to branch as one moves to the right in FIG. 4 and that it is not necessary for the code sequence at the root level to have only one element as illustrated.

All codes in a code tree cannot be used simultaneously in the same cell or other environment susceptible to mutual interference because all codes are not mutually orthogonal; a code can be used if and only if no other code on the path from the specific code to the root of the tree or in the sub-tree below the specific code is used. This means that the number of available channelization codes is not fixed but depends on the rate and spreading factor of each channel in the group of channels that potentially can mutually interfere.

Eligible channelization codes can be allocated randomly from the available eligible codes in the code tree structure for channels of different rates and spreading factors, which is to say that the eligible codes may be allocated without co-ordination between different connections, other than maintaining orthogonality. On the uplink, different users (connections) use different scrambling codes, so all of the spreading codes in a tree can be used for each user without co-ordination among different users. The situation on the downlink could be different because the BS typically uses only one scrambling code for all users (connections). Thus, spreading codes cannot be allocated so freely; co-ordination among users is needed.

The random allocation of codes from a tree results in an uneven distribution in the tree of the codes allocated in a cell. This limits the use of certain codes due to constraints described above, thus resulting in a higher incidence of blocking and/or delay for new calls. One possible solution is to re-arrange the codes allocated to ongoing calls, making codes available for new calls. The drawback of this strategy is that a large number of re-arrangements can be required, rendering this strategy difficult to use due to heavy signaling overheads involved.

SUMMARY

Applicants' invention provides a scheme for allocating and re-allocating channelization codes to new and existing channels in a way that makes the maximum number of codes available at a given time for channels of different rates and different spreading factors. If re-allocations are not performed, a communication system employing the invention has a higher capacity than a system employing a random allocation strategy. The invention also reduces signaling overhead for re-allocations in comparison to a random allocation strategy because fewer re-allocations are necessary.

In one aspect of Applicants' invention, a method of allocating spreading codes in a spread spectrum communication system is provided. The spreading codes are mutually related according to a tree-like structure having levels corresponding to communication channel bandwidths. The method includes the steps of setting a search level in a tree-like structure; determining whether the search level corresponds to a requested bandwidth for a communication channel; if the search level differs from the requested bandwidth, selecting a spreading code at a different level and repeating the previous step until the search level corresponds to the requested bandwidth for the communication channel; determining whether a spreading code at the search level is eligible to be allocated to the communication channel; and selecting an eligible spreading code for allocation to the communication channel.

In another aspect of the invention, the method of further includes the steps of repeating those steps for at least one other tree-like structure; comparing eligible spreading codes selected from the tree-like structures; and selecting an eligible spreading code for allocation to the communication channel based on the comparison.

In yet another aspect of the invention, the method further includes, when there is no eligible spreading code, the steps of determining whether a total free bandwidth of unallocated spreading codes is at least equal to the requested bandwidth; if the total free bandwidth is less than the requested bandwidth, indicating that the requested bandwidth is not available; if the total free bandwidth is at least equal to the requested bandwidth, selecting a spreading code allocated to another communication channel for re-allocation to the communication channel; and allocating a new spreading code to the other communication channel.

BRIEF DESCRIPTION OF THE DRAWINGS

Applicants' invention will be understood by reading this description in conjunction with the drawings, in which.

DETAILED DESCRIPTION

This application describes the invention in a context of a cellular radio CDMA communication system. It will be understood that this is just an example and that the invention can be applied in many other contexts.

Figure 5A:
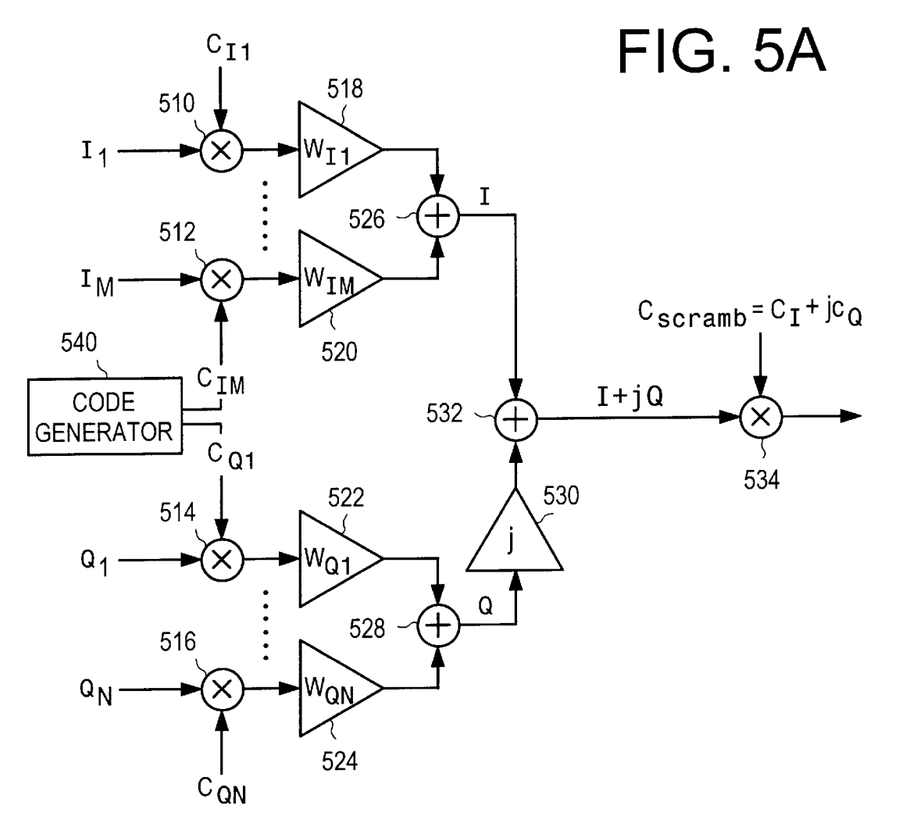
FIGS. 5A and 5B illustrate transmitters in a cellular communication system.

In a cellular radio CDMA communication system, a physical channel between a transmitter and a receiver is a bit stream of a certain rate that results from spreading (and scrambling, if desired) an information bit stream and that is allocated to either the in-phase (I) or quadrature (Q) branch in the transmitter. The structure of such a transmitter, which is usable in either a base station or a remote station in a cellular communication system, is illustrated in FIG. 5A.

A first data stream $I_1$ having a data rate of $R_1$ that is equal to a chip rate $R_c$ divided by the spreading factor $SF_{I1}$ for that data stream is supplied to a multiplier 510. The first data stream is spread with a channelization code word $C_{f1}$ having a length of $M=2^k$ chips that is supplied by a code generator 540, the operation of which is described in more detail below. The parameter k is related to the desired data rate of physical channel $I_1$ and is selected such that the output of the multiplier 531 has the chip rate $R_c$. For example, a physical channel data rate of 250 kbps is spread to a chip rate of four megachips per second (4 Mcps) by using a channelization code of length 16 ($M=2^4$) chips.

In general, further data streams may be supplied to multipliers 512, 514, and 516 (and other branches that are not shown) for spreading with respective channelization code words having lengths selected such that the resulting chip rates are also $R_c$. The rate of the data streams can be limited to such an interval that the spreading factors used are larger or equal to a predetermined $SF_{min}$. These code words are provided by the code generator 540.

Each physical channel is then weighted by respective amplifiers 518, 520, 522, and 524. The weights can be individually chosen to allocate the transmitter's power to each physical channel so that predetermined quality requirements, e.g., the bit error rate of each physical channel, are satisfied. The physical channels in the "I" branch of the transmitter are summed at summer 526. Similarly, the physical channels in the "Q" branch of the transmitter are summed at summer 528.

Figure 5B:
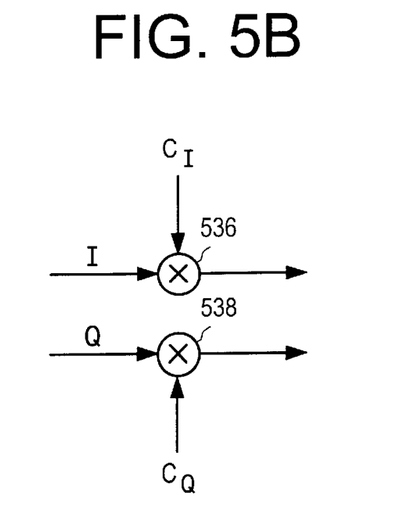

Scrambling, if desired, can be performed on the superimposed physical channels in at least two ways. First, as shown in FIG. 5A, scrambling can be performed by forming the I and Q pairs as a complex number at blocks 530 and 532 and then multiplying the result with another complex number (i.e., the complex-valued scrambling code $c_{scramb}=c_I+jc_Q$) at block 534. Scrambling can also be performed on the I and Q branches separately as illustrated in FIG. 5B, by multiplying I and Q with two real-valued scrambling codes $c_I$ and $c_Q$ at blocks 536 and 538. The scrambling code is clocked at the chip rate. The resultant signal is provided to, for example, radio transmit signal processing circuitry (e.g,. a QPSK or O-QPSK modulator followed by, possibly, pulse-shaping filters), amplified by a transmit power amplifier (not shown) and ultimately coupled to an antenna (also not shown).

It will be appreciated that other conventional components of conventional cellular communication systems, such as convolutional or other forward error correction coders and devices for puncturing the bit stream(s) and inserting information like power control commands, are omitted from FIG. 5A for clarity.

The spreading sequences produced by the code generator 540 and used by the multipliers 510–516 can be viewed in the tree-like manner illustrated in FIG. 4. Codes on the same level in the tree are mutually orthogonal and have the same spreading factor. Thus, codes $C_{4,1}$, $C_{4,2}$, $C_{4,3}$, and $c_{4,4}$ are mutually orthogonal codes, each of which has the same spreading factor (4), i.e., the same length M or number of chips. If a first channel is spread with a first code from the tree, and a second channel is spread with a second code from the tree that is (1) not the same as the first code, (2) not to the left of the first code on a path to the root of the tree, and (3) not in a subtree that has the first code as its root, then the first and second channels are mutually orthogonal. For example, if a first channel is allocated code $C_{4,1}$ and a second channel is allocated code $c_{8,5}$, then the first and second channels are mutually orthogonal. If instead the second channel were allocated code $c_{8,1}$ or $c_{8,2}$, then the first and second channels would not be mutually orthogonal.

The code generator 540, which may be a programmable processor and a memory, allocates a spreading code from the tree to every physical channel, with spreading factors matching the channels' respective data rates. As the data rate varies for a particular channel, a code from a different level of the tree will be allocated. For example, increasing a channel's data rate causes the selected code to move to the left in the tree, while decreasing the channel's data rate moves code selection to the right. Thus, a typical variable rate channel will typically move up and down along a certain path in the code tree as its data rate varies. As described in U.S. patent application Ser. No. 08/890,793 above incorporated by reference, codes from a code tree such as that shown in FIG. 4 are generally allocated to channels as spreading codes (e.g., $c_{f1}$, $C_{Q1}$, etc. in FIG. 5A) such that each channel is orthogonal to all other physical channels transmitted in a cell.

As noted above, allocating channelization codes randomly or in a pre-defined order results in an uneven distribution of allocated codes in the tree, limiting use of some codes and resulting in higher incidence of blocking and/or delay for new communication sessions, like voice calls and data transfers. Re-arranging the codes allocated to ongoing calls to make codes available for new calls has the drawback that a large number of re-arrangements is usually required, entailing heavy signaling overheads and delays due to the exchange of signals.

Figure 6:
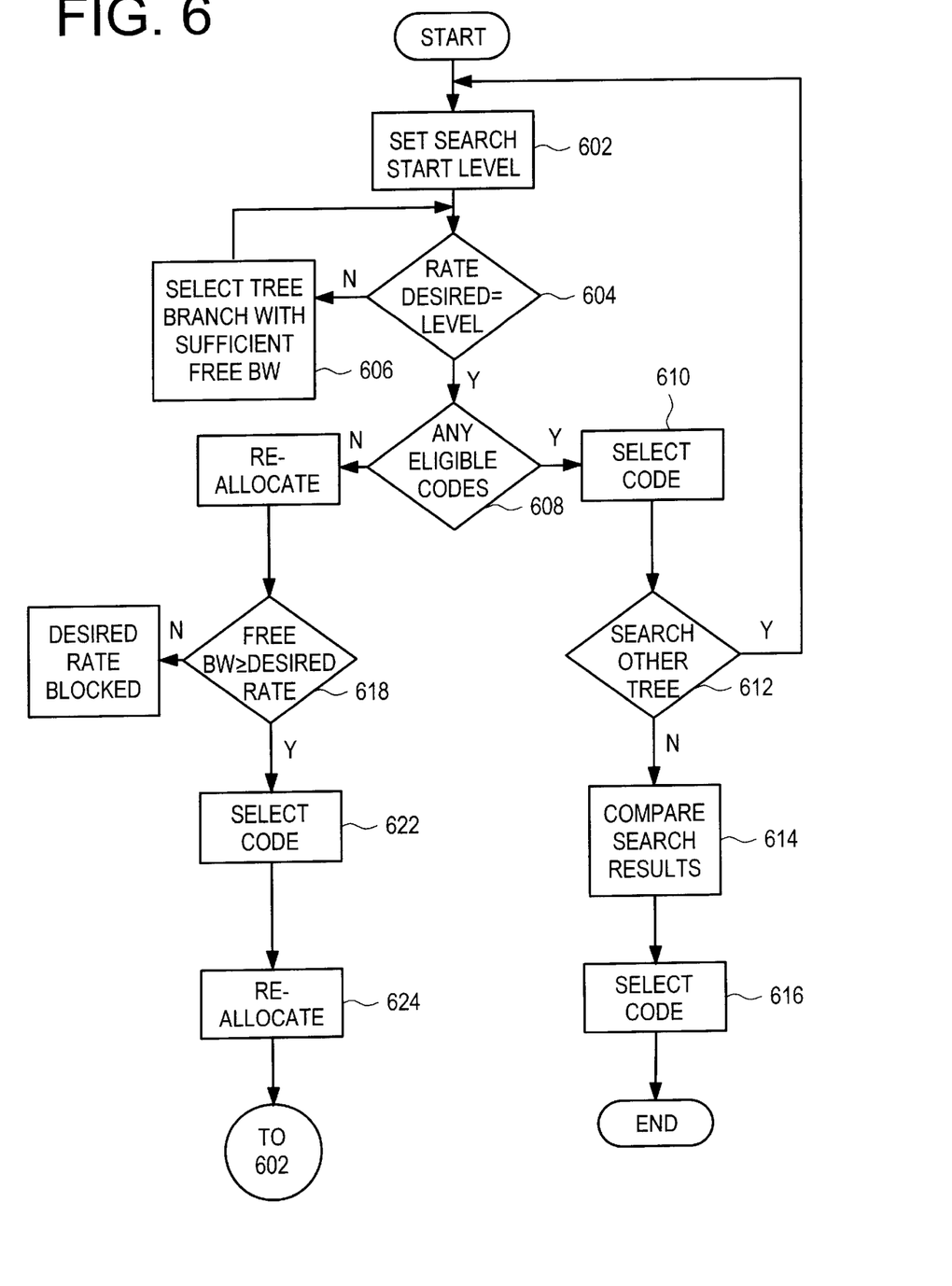
FIG. 6 is a flow chart of a method of allocating codes.

FIG. 6 is a flow chart of an exemplary method of allocating codes in response to a request for a code corresponding to a particular channel bandwidth. In essence, the method is a search of a code tree or subtree. In accordance with Applicants' invention, the search for free eligible codes is started (step 602) from the root of a code tree such as that illustrated in FIG. 4. Recognizing that code allocation is a question of radio resource management, the search for eligible codes can be performed at any location in the communication system where the appropriate information, i.e., the identities of the codes that have already been allocated and of all the codes that may be allocated. Typically, that location is the base station or base station controller or higher. Accordingly, the search process can be carried out by the code generator 540, which generally would be included in the control and processing unit 130. Given sufficient information, the search could also be carried out in the processing unit 180.

The search proceeds up the tree (from left to right in FIG. 4) until a code with the desired rate is reached (steps 604, 606). Selections between pairs of possible branches at every level are made on the basis of the branches' free bandwidths such that, in each pair, the branch having the minimum free bandwidth is explored first. The free bandwidth of a branch is determined by a summing process that is explained in more detail below. It should be noted that the free bandwidth of a branch should at least be equal to the bandwidth requested for the channel in order to continue to be considered in the code search process. Applicants' method can easily be modified to handle more complicated cases, such as re-arrangements of a code tree. The invention is explained below in more detail by some examples.

Figure 7:
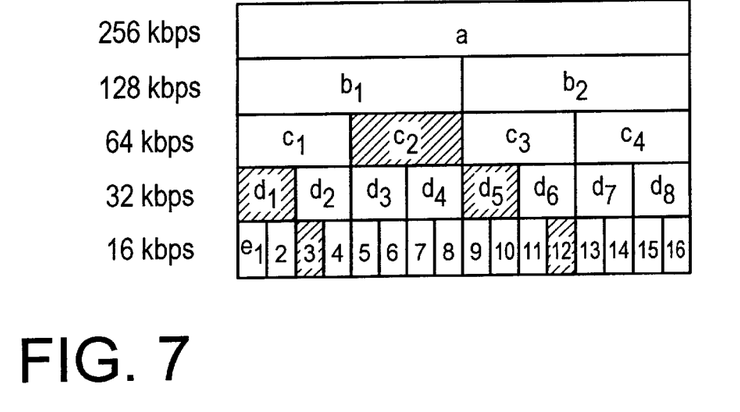
FIG. 7 is a snapshot showing free and occupied codes.

To help explain one aspect of Applicants' invention, code allocation without tree re-arrangement (steps 602–610), a snapshot of free and occupied codes in a code tree or subtree (branch) having a total bandwidth of 256 kbps is depicted in FIG. 7. In other words, a channel using spreading code a located at the root of the tree, would have a bandwidth of 256 kbps. Free codes, such as a, $b_1$, $b_2$, etc., are indicated by open blocks, and occupied codes, such as $c_2$, $d_1$, $d_5$, etc., are indicated by shaded blocks. It will be understood that "free" codes include codes that are "eligible" for allocation to connections (i.e., no related codes at other levels are occupied) and codes that are "ineligible" for allocation. In FIG. 7 for example, code $C_4$ is eligible, and codes a and $b_1$ are ineligible.

Suppose a new call requests a 16 kbps channel. Starting the search for a free code at the tree root (step 602), the first selection made (steps 604, 606) is branch $b_1$ because that branch's free bandwidth (16 kbps due to code $e_4$) is less than the free bandwidth (80 kbps due to summing codes $e_{11}$ and $c_4$) of that pair's other branch $b_2$ and is at least equal to the bandwidth requested. The only free eligible code $e_4$ in branch $b_1$ that has a data rate of 16 kbps is allocated to the new call by iterating steps 604, 606 until the e-level codes, corresponding to the rate desired for the new call, are reached and then executing steps 608, 610.

Now suppose that a second user requests a 16 kbps channel. Since branch $b_1$ is now fully occupied, the only possibility is to trace branch $b_2$ for possible eligible codes. In the code tree snapshot illustrated in FIG. 7, branch $c_3$ having a free bandwidth of 16 kbps is selected for further search for the same reasons that branch $b_1$ was selected for the first user, and the only eligible code $e_{11}$ in branch $C_3$ is allocated to the second user for the same reasons.

It will be appreciated that this allocation strategy tends to keep free the maximum number of codes, looking towards the root of the tree, in order to accommodate possible requests for higher-bit-rate services. In contrast, a random allocation strategy would have permitted any code among the eligible codes $e_{13}, e_{14}, e_{15},$ and $e_{16}$ to have been allocated to the second user, leaving no free eligible code for 32 kbps and 64 kbps services.

Figure 8:
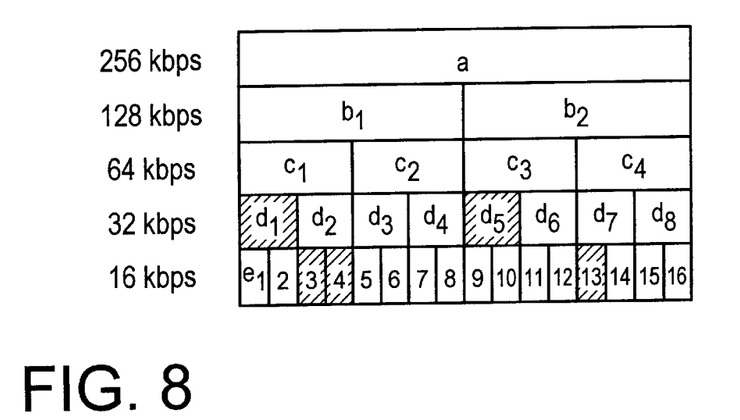
FIG. 8 is another snapshot showing free and occupied codes.

If channel bandwidths only less than a predetermined level are of interest, the method described above in connection with FIG. 7 may be modified somewhat. It will be understood that such a situation might arise when multiple spreading codes can be allocated to obtain a channel bandwidth greater than the predetermined level, or when it is not desirable to assign too large a bandwidth to any single user. For example, suppose that a code tree or subtree is as illustrated in FIG. 8 and assume that 64 kbps is the maximum bandwidth for any one code that any user can be assigned from the tree.

Suppose a new call arrives with a desired bandwidth of 32 kbps. Using the method as applied to FIG. 7, the code $d_3$ would be allocated to the new call, which would be consistent with a desire to increase the chances of freeing a code corresponding to a bandwidth of 128 kbps. In a situation where the maximum allocatable bandwidth is 64 kbps, however, this does not make sense. Instead, four different subtree searches are performed, rooted in codes $c_1, c_2, c_3,$ and $c_4$ that correspond to the highest bandwidth of interest, e.g., 64 kbps. These can be carried out by setting the start level of the search (step 602 in FIG. 6) to the root of a first one of the subtrees, and then recognizing (step 612) that additional subtrees should be searched. The results from the subtree searches are compared (step 614), resulting in the selection (step 616) of either code $d_6$ or $d_8$, both of which leave a free code of bandwidth 64 kbps. Allocating either code $d_6$ or $d_8$ can be ore advantageous than allocating codes $d_3$ and $d_4$, which have no lower allocated codes, because doing so maximizes flexibility for allocating codes to other connections. The selection between code $d_6$ and $d_8$ can be based on a preferred strategy, e.g., prefer to allocate codes from one side or the other of the tree.

Figure 9:
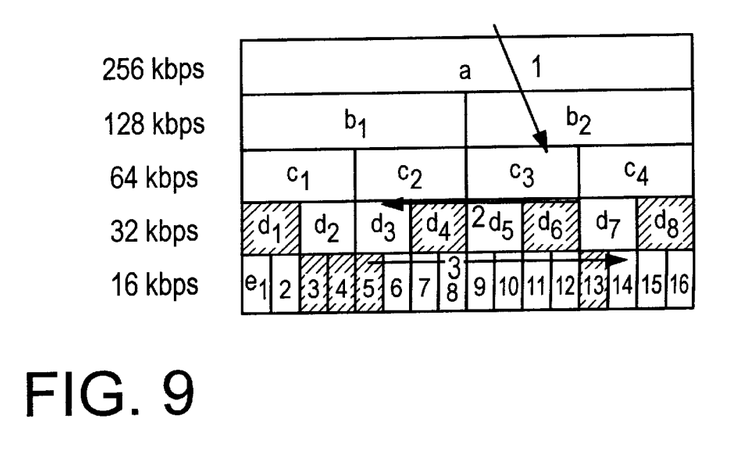
FIG. 9 is another snapshot showing free and occupied codes.

Typically, tree searches will be carried out when new connections are requested, which may include bandwidth-change requests from existing connections. Although the above-described scheme allocates codes efficiently, high call arrival and departure rates may leave a number of holes in the code tree. It may thus be desirable to re-arrange from time to time the remaining allocations of codes to make space for arriving calls. It will be understood that this is a form of combinatorial packing problem that can be solved with a variety of strategies, e.g., order channels according to bandwidth and pack them from left to right in the code tree. Rather than such a strategy, it is currently believed that re-arranging should be done with as few re-arrangements as possible. FIG. 9 illustrates how this principle can be employed in an exemplary situation, from which it can readily be seen how to apply the principle to other situations.

Suppose a channel having a 64 kbps bandwidth is requested, as indicated by the arrow 1. As seen in FIG. 9, no such code is available, although the total free bandwidth in the tree (i.e., the sum of the bandwidths of eligible unallocated codes) is 64 kbps, enough to accommodate the call. This is determined in step 618 shown in FIG. 6. If the total free bandwidth is not enough to accommodate the requested channel, the request is blocked, which is illustrated by step 620.

Of the four unallocated codes in FIG. 9, it is determined that the code $c_3$ has the fewest occupied codes "underneath" it, i.e., in branches further up the tree (step 622). Thus, the channel(s) corresponding to this or these upper-level codes are candidates for being "moved" by allocating different codes to them using the method described above and treating each channel to be moved as a new request. In FIG. 9, the channel using code $d_6$ can be allocated (step 624) a different code, e.g., code $d_3$ as indicated by the arrow 2, and the new channel can be allocated code $C_3$, and this re-allocation can be communicated to the entities using those channels by the appropriate overhead signaling messages.

It should be understood that these re-allocations preferably are not individually implemented as they are determined. The code generator 540 or more generally the control processor determines all of the re-allocations needed before implementing any, and assesses their effects. This permits the processor to try different re-allocations, looking for the optimal one.

A channel that is a candidate to be moved is treated in the same way as a request for a new channel. Thus continuing the previous example, the channel that had been using code $d_6$ is treated as if it were a request for a new channel. If a code having the appropriate bandwidth is available, then the code is allocated by the method illustrated by FIGS. 6 and 7. In FIG. 9, two such codes are available, $d_3$ and $d_7$, and the choice between these codes can be made in accordance with a strategy preferring to allocate codes from one side or the other of the tree. In FIG. 9, codes are preferentially allocated first from the left side of the tree.

It can be noted that code $d_2$ is less "available" that codes $d_3$ and $d_7$ because code $d_2$ has a greater number of already allocated codes "underneath" it, i.e., in upper levels of the tree. Re-allocating a code at one level of the tree might require re-allocating already allocated codes "underneath" that re-allocated code, and such codes should be selected in a manner that is consistent with the overall selection strategy, e.g., minimizing the number of re-allocations.

In FIG. 9, it can be seen that allocating code $d_3$ to the channel that had been allocated code $d_6$ as illustrated by the arrow 2 requires re-allocating an e-level code to the channel that had been allocated code $e_5$. Again, that channel is treated as a request for a new channel and a code is allocated according to the method illustrated by FIGS. 6 and 7. In FIG. 9, the channel formerly allocated code $e_5$ is re-allocated code $e_{14}$ as indicated by the arrow 3. In this way, the method is applied recursively to succeeding levels of the tree.

It will be understood that it is possible to use a criterion for determining re-allocation cost that is more sophisticated than minimizing the number of channels needed to be moved. For example, channels corresponding to different levels in the tree may have different re-allocation costs, and these differences may be included in the determining whether further re-allocations are appropriate in view of their costs. Costs may differ for many reasons. For example, re-allocating a high-bandwidth code may have a lower cost than re-allocating a low-bandwidth code because the overhead signaling needed would have a smaller impact on the high-bandwidth channel than it would on the low-bandwidth channel.

It is currently believed that code allocation in accordance with Applicants' invention has substantially optimal performance under moderate load conditions. Methods of allocating codes according to Applicants' invention enjoy at least the advantages low blocking rate and/or delay for new calls, higher bandwidth utilization, and low signaling overheads.

It will be appreciated by those of ordinary skill in the art that this invention can be embodied in other specific forms without departing from its essential character. The embodiments described above should therefore be considered in all respects to be illustrative and not restrictive. The scope of Applicants' invention is determined by the following claims, and all modifications that fall within that scope are intended to be included therein.

What is claimed is:

1. A method of allocating spreading codes in a spread spectrum communication system, the spreading codes being mutually related according to a tree-like structure having levels corresponding to communication channel bandwidths, comprising the steps of:

(a) setting a search level in a tree-like structure;

(b) determining whether the search level corresponds to a requested bandwidth for a communication channel;

(c) if the search level differs from the requested bandwidth, selecting a spreading code at a different level and repeating step (b) until the search level corresponds to the requested bandwidth for the communication channel;

(d) determining whether a spreading code at the search level is eligible to be allocated to the communication channel; and (e) selecting an eligible spreading code for allocation to the communication channel.

2. The method of claim 1, further comprising the steps of:

(f) repeating steps (a) through (e) for at least one other tree-like structure;

(g) comparing eligible spreading codes selected from the tree-like structures; and (h) selecting an eligible spreading code for allocation to the communication channel based on the comparison.

3. The method of claim 1, further comprising, when step (d) determines a lack of an eligible spreading code, the steps of:

(i) determining whether a total free bandwidth of unallocated spreading codes is at least equal to the requested bandwidth;

(j) if the total free bandwidth is less than the requested bandwidth, indicating that the requested bandwidth is not available;

(k) if the total free bandwidth is at least equal to the requested bandwidth, selecting a spreading code allocated to another communication channel for re-allocation to the communication channel; and (l) allocating a new spreading code to the other communication channel.

4. The method of claim 1, wherein step (a) comprises setting the search level to the root of the tree-like structure.

5. The method of claim 1, wherein step (a) comprises setting the search level to a level of the tree-like structure corresponding to a maximum bandwidth allocable to a user of the communication system.

6. The method of claim 1, wherein step (c) comprises the step of selecting a first spreading code of two spreading codes at the next level of the tree-like structure based on the following criteria:

the free bandwidth associated with the first spreading code is at least equal to a bandwidth parameter associated with the service request, and the free bandwidth associated with the first spreading code is less than the free bandwidth allocable to the other spreading code.

7. In a spread spectrum communication system that allocates bandwidth to connections using mutually orthogonal Walsh-Hadamard spreading code sequences logically representable by a tree-like data structure having levels indicative of communication channel bandwidths, a method of assigning a spreading code to a service request, comprising the steps of:

(a) initiating a search for a spreading code at a selected level in the tree-like structure; and (b) if the bandwidth associated with the selected level is greater than the bandwidth parameter associated with the service request, iteratively performing the following steps:

(1) selecting a first spreading code of two spreading codes at the next level of the tree-like structure based on the following criteria:
   the free bandwidth associated with the first spreading code is at least equal to a bandwidth parameter associated with the service request, and
   the free bandwidth associated with the first spreading code is less than the free bandwidth allocable to the other spreading code; and (2) if the free bandwidth associated with the first spreading code corresponds to a bandwidth parameter associated with the service request, allocating the first spreading code to the service request.

8. The method of claim 7, wherein the predetermined level corresponds to the root of the tree-like structure.

9. The method of claim 7, wherein the predetermined level corresponds to a maximum bandwidth parameter associated with the service request.

10. In a spread spectrum communication system that allocates bandwidth to connections using mutually orthogonal Walsh-Hadamard spreading code sequences logically representable by a tree-like data structure having levels indicative of communication channel bandwidths, a method of assigning a spreading code to a service request, comprising the steps of:

(a) initiating a search for a spreading code at a level in the tree-like structure corresponding to a maximum allowable connection bandwidth;

(b) if the bandwidth associated with the selected level is greater than the bandwidth parameter associated with the service request, recursively performing the following steps:
  (1) selecting a first spreading code of two spreading codes at the next level of the tree-like structure based on the following criteria:
    the free bandwidth associated with the first spreading code is at least equal to a bandwidth parameter associated with the service request, and
    the free bandwidth associated with the first spreading code is less than the free bandwidth allocable to the other spreading code; and
  (2) if the free bandwidth associated with the first spreading code corresponds to a bandwidth parameter associated with the service request, storing in a memory register the first spreading code and the free bandwidth in the sub-tree; and
(c) repeating step (b) for each sub-tree having a root at a bandwidth corresponding to the maximum allowable bandwidth.

11. The method of claim 10, further comprising the steps of:
  (e) determining whether the total free bandwidth of the unallocated memory codes in the memory register is at least equal to the bandwidth parameter associated with the service request;
  (f) if the total free bandwidth of an unallocated memory code in the memory register is at least equal to the bandwidth parameter associated with the service request, allocating to the service request a spreading code from the memory register; and
  (g) if the total free bandwidth of the unallocated memory codes in the memory register is less than the bandwidth parameter associated with the service request, reallocating memory codes in the tree-like structure.

12. The method of claim 10, wherein step (d) comprises the step of allocating the service request to the spreading code associated with the minimum available bandwidth.

13. A base station in a spread spectrum communication system, comprising:
  a control and processing unit for controlling connections to a public switched telephone network;
  at least one traffic channel transceiver,
  a control channel transceiver, and
  a code generator, including a processor and associated memory for storing mutually orthogonal Walsh-Hadamard spreading code sequences logically representable by a tree-like data structure having levels indicative of communication channel bandwidths, wherein the code generator is operable to assign spreading codes to received service requests by recursively searching the tree-like data structure for a spreading code having free bandwidth that corresponds to a bandwidth parameter associated with a received service request and wherein the code generator assigns spreading codes to the received service requests by:
  (a) initiating a search for a spreading code at a level in the tree-like structure corresponding to a maximum allowable connection bandwidth;
  (b) if the bandwidth associated with the selected level is greater than the bandwidth parameter associated with the service request, recursively performing the following steps:
    (1) selecting a first spreading code of two spreading codes at the next level of the tree-like structure based on the following criteria:
      the free bandwidth associated with the first spreading code is at least equal to a bandwidth parameter associated with the service request, and
      the free bandwidth associated with the first spreading code is less than the free bandwidth allocable to the other spreading code; and
    (2) if the free bandwidth associated with the first spreading code corresponds to a bandwidth parameter associated with the service request, storing in a memory register the first spreading code and the free bandwidth in the sub-tree; and
  (c) repeating step (b) for each sub-tree having a root at a bandwidth corresponding to the maximum allowable bandwidth.

* * * * *